Figure 1:
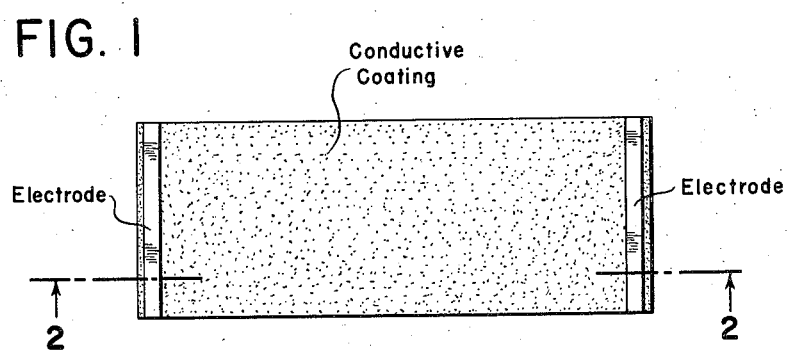

Aug. 20, 1957  R. SMITH-JOHANNSEN  2,803,566
METHOD OF COATING ARTICLES WITH HEAT-RESISTANT
ELECTRICALLY CONDUCTING COMPOSITIONS
Filed April 28, 1953

INVENTOR
Robert Smith-Johannsen
ATTORNEYS

United States Patent Office 2,803,566
Patented Aug. 20, 1957

2,803,566

METHOD OF COATING ARTICLES WITH HEAT-RESISTANT ELECTRICALLY CONDUCTING COMPOSITIONS

Robert Smith-Johannsen, Niskayuna, N. Y., assignor, by mesne assignments, to S-J Chemical Company, Niskayuna, N. Y., a copartnership, consisting of Robert Smith-Johannsen and Sanford A. Shuler, Jr.

Application April 28, 1953, Serial No. 351,731

17 Claims. (Cl. 117—216)

This invention relates to electrically conductive compositions and more particularly to electrically conductive coatings composed of particles of electrically conductive material dispersed throughout very finely divided colloidal silica. The present invention also embraces a method of applying such a composition to a surface.

Generally, electrically conductive coatings or films consist of a conducting material dispersed throughout a non-conductive adhesive vehicle. The nature of the materials and the concentrations used determine the electrical conductivity of the resulting films. The films are subjected to high temperatures during operation and the operating temperatures that may be safely employed are necessarily limited by the nature of the vehicles in which the conducting particles are dispersed. For example, films formed of silicone resins with conducting material dispersed therein, when applied to a surface and dried, are limited to operating temperatures in the neighborhood of 400° C. At higher temperatures these films develop hot spots and burn out and so lose all adhesion to the surfaces upon which they were deposited. Similarly, films employing sodium silicate as an adhesive vehicle, besides being very susceptible to moisture, fail when approaching red heat by the formation of hot spots resulting in spontaneous burn-out.

A coating composition according to the present invention comprises a mixture of particles of electrically conductive material and finely divided colloidal silica. Applied films of the composition of the present invention are extremely heat resistant in that they withstand operating temperatures of a much higher order than has been heretofore possible without burn-out or loss of adhesion. These films may be operated at extreme temperatures of greater than 600° C. The films have good hardness, abrasion resistance and bond strength. When the films are brought up to red heat by passing a current therethrough, they are unaffected and there is no decrease in the bond strength to the surface upon which they are applied. The compositions of the present invention produce highly conducting and highly reinforced paint films.

The compositions of the present invention may be applied in any conventional or well-known manner such as brushing or spraying, and may be air dried or set by baking if desired.

Figure 2:
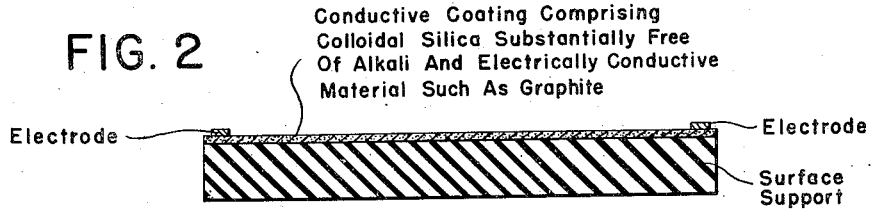

In the drawing:

Fig. 1 is a plan view showing a base having the conductive coating adhered thereto together with electrodes made in accordance with this invention; and Fig. 2 is a sectional view of Fig. 1 taken along the line 1—1.

The colloidal silica used as a non-conductive, adhesive bond agent or carrier for the conductive particles in the composition of the present invention is a unique material and does not resemble any other common inorganic colloidal dispersion. Such a colloidal silica is marketed under the trade name "Ludox" by E. I. Du Pont de Nemours and Company. The "Ludox" colloidal silica is composed of 29 to 31% $SiO_2$, 0.29 to 0.39% $Na_2O$ and a maximum of 0.15% sulfates as $Na_2SO_4$, and is obtainable in the form of a water slurry containing about 30% solids. The silica particles are extremely small, ranging from about 0.01 to 0.03 micron in maximum dimension. The colloidal dispersion has an insolubilizing action on water soluble substances, such as water soluble synthetic resins. Another very important property of such a colloidal silica is that the silica is irreversibly precipitated. Once the colloidal silica is dispersed, in water for example, and dried, it becomes irreversible and cannot be redispersed.

Ludox colloidal silica and the method of making it is described in detail in U. S. Patents Nos. 2,244,325, issued June 3, 1941; 2,574,902, issued November 13, 1951; and 2,597,872, issued May 27, 1952. These patents further describe Ludox colloidal silica as a stable aqueous silica sol generally having a silica-alkali ratio from about 60:1 to 130:1 containing discrete silica particles, having a molecular weight, as determined by light scattering of more than one-half million. It has a relative viscosity, at 10 percent $SiO_2$, from 1.15 to 1.55 and generally contains from 20 to 35 percent by weight of $SiO_2$. The silica-alkali ratio of Ludox silica is calculated as $Na_2O$ and may be as low as 10:1 but it is advantageous to use a Ludox silica containing a silica-alkali ratio of between about 60:1 to 130:1. The silica-alkali ratio makes it obvious that the silica and alkali are combined in a special manner not found in conventional metal alkali silicates since the latter cannot be prepared in a form soluble and stable in aqueous solutions at ratios above 4:1. The alkali present is not uniformly distributed throughout the $SiO_2$ particles as it is in conventional silicate such as water glass but is substantially all outside the $SiO_2$ particles. The alkali is present as a stabilizer for the $SiO_2$ sol and prevents condensation of the $SiO_2$ particles. The Ludox silica sols could be prepared and used in the absence of alkali but this is not practical because they gel up very rapidly and cannot be stored.

Ludox colloidal silicas are generally prepared by passing a silicate through an ion exchange resin to remove the alkali as described in United States Patent No. 2,244,325. If all of the alkali is removed from the silicate, the resulting sols are not stable, but they can be stabilized by adding a small amount of alkali such as $Na_2O$ or $K_2O$.

It is also particularly advantageous to use Ludox silica having a particle size of less than 30 millimicrons (0.03 micron), although the particles of Ludox may be of colloidal dimensions, that is, particles having an average size not exceeding 100 millimicrons (0.1 micron) nor less than about 1 millimicron (0.001 micron). The particle size of Ludox colloidal silica is determined as the average size of particle present when the solution is diluted to about 0.1% $SiO_2$ with water and dried in a very thin layer deposit as described in the above-mentioned patent. It is also advantageous to use a Ludox silica containing between about 29–30% SiO$_2$ although higher and lower amounts can be used. Stable Ludox silica sols containing 5 to 15% SiO$_2$ can be prepared according to the United States Patent No. 2,244,325, while the more advantageous Ludox silica sols containing 20 to 35% by weight SiO$_2$ can be prepared according to the United States Patent No. 2,574,902. For a further and more detailed description of Ludox colloidal silica and to the method of making it, the above patents may be referred to.

In practicing the invention the colloidal silica is mixed with electrically conductive particles of a much larger size than the silica particles and formed into a slurry. The conductive particles may range in size from about 0.1 micron up to about 20 mesh. Where graphite powder is used, it may be employed in a particle size range of from about 1 to 10 microns. A typical example of a composition of the present invention in parts by weight is as follows:

Colloidal silica "Ludox"_____ 75 (30% solids).
Fine graphite powder_____ 25.

Water is used as the dispersing medium and it is only necessary to add sufficient water to form a coatable composition. The extremely active particles of the colloidal silica act as a very strong binder in themselves, and it is not necessary to use any soluble binder at all with the above composition.

Films of the composition of the invention applied to surfaces, such as insulating surfaces, have excellent electric conductivity and physical properties. The films have good hardness, abrasion resistance and bond strength and these properties are unchangd by heating the film to red heat. The watt density may be raised up to about 20 watts per square inch without any arcing or burnout. Even under severe conditions when the watt density is raised to where severe arcing and burn-out does occur, there is no observable decrease in the bond strength to the surface upon which the film is deposited. The films give off no objectionable odors during heating. The films have good heat aging properties, and stable electrical properties, so that the resistance does not change during use.

The proportions of electrically conductive material which may be dispersed throughout the colloidal silica slurry may vary within wide limits. For example, when graphite is present in amount of about 60% or less based on the total solid content of the silica and graphite in the mixture, good electrical conductivity and physical properties result. When the graphite percentage is reduced to about 25% and below, the conductivity of the composition falls off rapidly. A preferred range is about 29% to about 51% graphite. These limitations, however, are not to be considered critical, for the graphite concentrations may fall outside these limits dependent upon the degree of conductivity desired in the film and the presence of other materials in the mixture in addition to the graphite and colloidal silica. It is desirable, however, to have a surface resistance of between 10 and 100 ohms per square and the concentrations of the electrically conductive material should be sufficient to obtain a resistance within that range. The nature of the electrically conductive material chosen will also affect the electrical conductivity of the resulting films and also the proportions of electrically conductive material which will be necessary to achieve the desired electrical conductivity.

Many electrically conductive materials suitable for use in electrically conductive films may be utilized with the unique colloidal silica according to the present invention. Examples of suitable electrically conductive materials are colloidal or semi-colloidal graphite, finely divided graphite powder, graphite flakes, colloidal carbon, and the like. These electrically conductive materials may be used singly or in combination. A combination of a finely divided powdered material with a material of larger particle size is advantageous. Flakes are particularly effective as the larger particle size conductive material. A combination of finely divided graphite powder with graphite flakes has been found to be particularly advantageous. Other combinations may, of course, be employed. Combination of large and small electrically conductive materials prevent crack formations and permit high loadings and thus less resistance in the dried film.

It is also possible to impregnate applied films composed of the composition of the present invention with solutions of various resinous materials. The electrically conductive compositions and films formed in accordance with the present invention are porous and the impregnation of the compositions and films by a flexible resinous material such as a silicone resin imparts thereto the flexible characteristics of the impregnating resin. The impregnation of the films still further increases the film strength and adds surface insulation without raising the resistance of the films more than a few percent. The impregnation by a resin solution does not disrupt the electrical conductivity paths established during the initial drying.

A wide variety of resinous materials may be used for impregnating the films. Various natural or synthetic resins commonly used in protective coatings or paints such as phenolic resins, alkyd resins, thermoplastic vinyl resins and the like may be utilized, if desired. However, silicone resins are particularly effective. Silicone resins containing alkyl or aryl groups, or both, such as polymethylsilicones, dimethylsilicones, diethylsilicones, methylethylsilicones, phenylsilicones, methylphenylsilicones and the like may be utilized. Blends of the above may, of course, be used, if desired. The choice of resin depends largely on the desired flexibility of the film and the operating temperatures desired.

The films when impregnated with solutions of organic or silicone polymers will, of course, have an operating temperature limited to the operating temperature of the particular resin used to impregnate the electrically conductive colloidal silica film. Such films are useful in a moderate temperature range. The films made in this manner by impregnating the dried conductive colloidal silica films are far stronger and tougher than films of equivalent electrical properties made by dispersing the conductive colloidal silica mixture directly in the resin. As hereinbefore pointed out, conductive films formed with the irreversibly precipitable colloidal silica cannot be redispersed. Thus, impregnating such films with any resinous material dissolved in a suitable solvent does not affect the very strong and tough bond between the particles of the electrically conductive material or disrupt the electrical conducting paths established during the initial drying which constitute the electrical circuit. The bond is thus not infiltrated or weakened by the resin or solvent.

The watt densities of the films formed from the composition of the present invention can be raised to values above about 20 watts per square inch by adding low melting (650–1000° C.) metal oxides to the composition while maintaining the conductivity between 10 and 100 ohms per square inch. The addition of clay, mica dust, calcium carbonate and zinc dust, either alone or combined and in amounts totaling up to about 25% by weight of the composition, causes a reduction in the arcing and burnouts. Clay is particularly effective and can be usefully incorporated in proportions of from about 12% to about 48% by weight where the remaining ingredients are colloidal silica and graphite. The addition of low melting metal oxides such as antimony oxide (Sb$_2$O$_3$) and bismuth oxide (Bi$_2$O$_3$) in proportions within the same range quite effectively prevents arcing. Antimony oxide and bismuth oxide are particularly advantageous in this respect and are even more effective when combined than when used separately.

An example of a composition embodying the addition of clay is as follows, the proportions being in parts by weight:

| | |
|---|---|
| Colloidal silica "Ludox" | [1] 59 |
| Fine graphite powder | 19 |
| China clay | 22 |
| Total | 100 |

[1] 30% solids.

An example of a composition embodying the metal oxide addition is as follows, the proportions being in parts by weight:

| | |
|---|---|
| Colloidal silica "Ludox" | [1] 59 |
| Fine graphite powder | 19 |
| Antimony oxide | 11 |
| Bismuth oxide | 11 |
| Total | 100 |

[1] 30% solids.

When an asbestos board is coated with the above formulation and fitted with appropriate electrodes, it is possible to operate at a watt density of 20 watts per square inch for a considerable length of time without failure occurring.

The present invention is not to be considered limited to the use of the particular colloidal silica "Ludox" disclosed. For example, the percentage of the silica dispersed may vary above or below the 29 to 31% that is disclosed. However, solutions containing about 30% $SiO_2$ are particularly advantageous.

Many different embodiments of this invention may be made without departing from the spirit and scope thereof and the invention is not to be considered limited to any specific embodiment herein disclosed except as defined by the appended claims.

I claim:

1. A composition comprising an aqueous dispersion of particles of electrically conductive material and an alkali-stabilized colloidal silica in the form of dispersed particles having a particle size of 1 to 100 millimicrons and having the alkali substantially all outside the silica particles.

2. A composition comprising an aqueous dispersion of dispersed graphite particles and an alkali-stabilized colloidal silica in the form of dispersed particles having a particle size of 1 to 100 millimicrons and having the alkali substantially outside the silica particles.

3. The composition of claim 2 in which the particle size of the silica particles is less than 30 millimicrons.

4. An electrically conductive coating composition comprising particles of graphite dispersed throughout an aqueous silica sol having a silica-alkali ratio of from about 60:1 to 130:1, containing discrete silica particles having a molecular weight, determined by light scattering, of more than one-half million, having a relative viscosity at 10 percent $SiO_2$, from 1.15 to 1.55 and containing from 20 to 35 percent by weight $SiO_2$.

5. An electrically conductive coating composition comprising particles of graphite and china clay dispersed throughout an aqueous silica sol having a silica-alkali ratio of from about 60:1 to 130:1, containing discrete silica particles having a molecular weight, determined by light scattering, of more than one-half million, having a relative viscosity at 10 percent $SiO_2$, from 1.15 to 1.55 and containing from 20 to 35 percent by weight $SiO_2$.

6. An article of manufacture comprising a porous electrically conducting composition adhered to an insulating base comprising particles of graphite distributed throughout and bonded together with colloidal silica particles having a particle size of 1 to 100 millimicrons and having substantially no alkali distributed throughout the silica particles.

7. The porous electrically conducting composition of claim 6 in which the particle size of the silica particles is less than 30 millimicrons.

8. The porous electrically conducting composition of claim 7 in which the silica particles have an average molecular weight, as determined by light scattering, of more than one-half million.

9. The electrically conducting composition of claim 6 in which the pores are filled with a resin.

10. The method of coating an insulating surface with a porous electrically conductive composition which comprises applying to the surface a composition comprising particles of graphite dispersed throughout an aqueous alkali-stabilized colloidal silica in the form of dispersed particles having a particle size of 1 to 100 millimicrons and in which the alkali is substantially all outside the silica particles and allowing the composition to dry and adhere to the insulating surface.

11. The method of coating an insulating surface with a porous electrically conductive composition which comprises applying to the surface a composition comprising particles of graphite dispersed throughout an aqueous alkali-colloidal silica in the form of dispersed particles having an ultimate particle size of less than 30 millimicrons, a silica-alkali ratio of from about 60:1 to 130:1, an average molecular weight, as determined by light scattering, of more than one-half million, and in which the alkali is substantially all outside the silica particles and allowing the composition to dry and adhere to the insulating surface.

12. The method of claim 11 which also comprises the step of impregnating the dried porous electrically conducting coating with a resinous material.

13. The method of coating an insulating surface with a porous electrically conductive composition which comprises applying to the surface an aqueous composition comprising particles of graphite and china clay dispersed throughout a colloidal silica bonding agent having a silica-alkali ratio of from about 60:1 to 130:1 containing discrete silica particles having a molecular weight, as determined by light scattering, of more than one-half million, having a relatively viscosity, at 10 percent $SiO_2$, from 1.15 to 1.55 and containing from 20 to 35 percent by weight of $SiO_2$, drying the coating and impregnating the applied coating with a resinous material.

14. The method of coating a surface with an electrically conductive composition which comprises applying to the surface an aqueous composition comprising particles of electrically conductive material dispersed throughout a colloidal silica bonding agent having a silica-alkali ratio of from about 60:1 to 130:1 containing discrete silica particles having a molecular weight, as determined by light scattering, of more than one-half million, having a relative viscosity, at 10 percent $SiO_2$, from 1.15 to 1.55 and containing from 20 to 35 percent by weight of $SiO_2$, drying the composition to form a porous coating, and then impregnating the applied coating with a resinous material.

15. The method of claim 14 in which the resinous material is a silicone resin.

16. The method of coating a surface with an electrically conductive composition comprising applying to the surface an aqueous composition comprising particles of electrically conductive material and a low melting metal oxide dispersed throughout a colloidal silica bonding agent having a silica-alkali ratio of about 60:1 to 130:1 containing discrete silica particles having a molecular weight, as determined by light scattering, of more than one-half million, having a relatively viscosity, at 10 percent $SiO_2$, from 1.15 to 1.55 and containing from 20 to 35 percent by weight of $SiO_2$, drying the composition to form a porous coating, and then impregnating the applied coating with a resinous material.

17. The method of coating a surface with an electrically conductive composition which comprises applying to the surface a composition comprising particles of electrically conductive material partly in the form of a finely divided powder and partly in the form of flakes, bismuth oxide, and antimony oxide dispersed throughout a colloidal silica bonding agent having a silica-alkali ratio of from about 60:1 to 130:1 containing discrete silica particles having a molecular weight, as determined by light scattering, of more than one-half million, having a relative viscosity, at 10 percent $SiO_2$, from 1.15 to 1.55 and containing from 20 to 35 percent by weight of $SiO_2$ to form a porous coating, allowing the coating to dry and then impregnating the coated composition with a silicone resin.

References Cited in the file of this patent

UNITED STATES PATENTS

| | | |
|---|---|---|
| 904,183 | Dalen | Nov. 17, 1908 |
| 1,868,565 | Connolly | July 26, 1932 |
| 1,985,840 | Sadtler | Dec. 25, 1934 |
| 2,348,045 | Wooten | May 2, 1944 |
| 2,419,537 | Christensen | Apr. 29, 1947 |
| 2,436,733 | Schneider | Feb. 24, 1948 |
| 2,685,533 | Trigg et al. | Aug. 3, 1954 |
| 2,705,749 | Daily et al. | Apr. 5, 1955 |

OTHER REFERENCES

Printed Circuit Techniques (Nat. Bur. of Standards Circular 468), 1947, pages 6 and 19.